July 6, 1943.  J. H. MacDONALD  2,323,614
PROPELLER NUT HANGER
Filed March 21, 1941
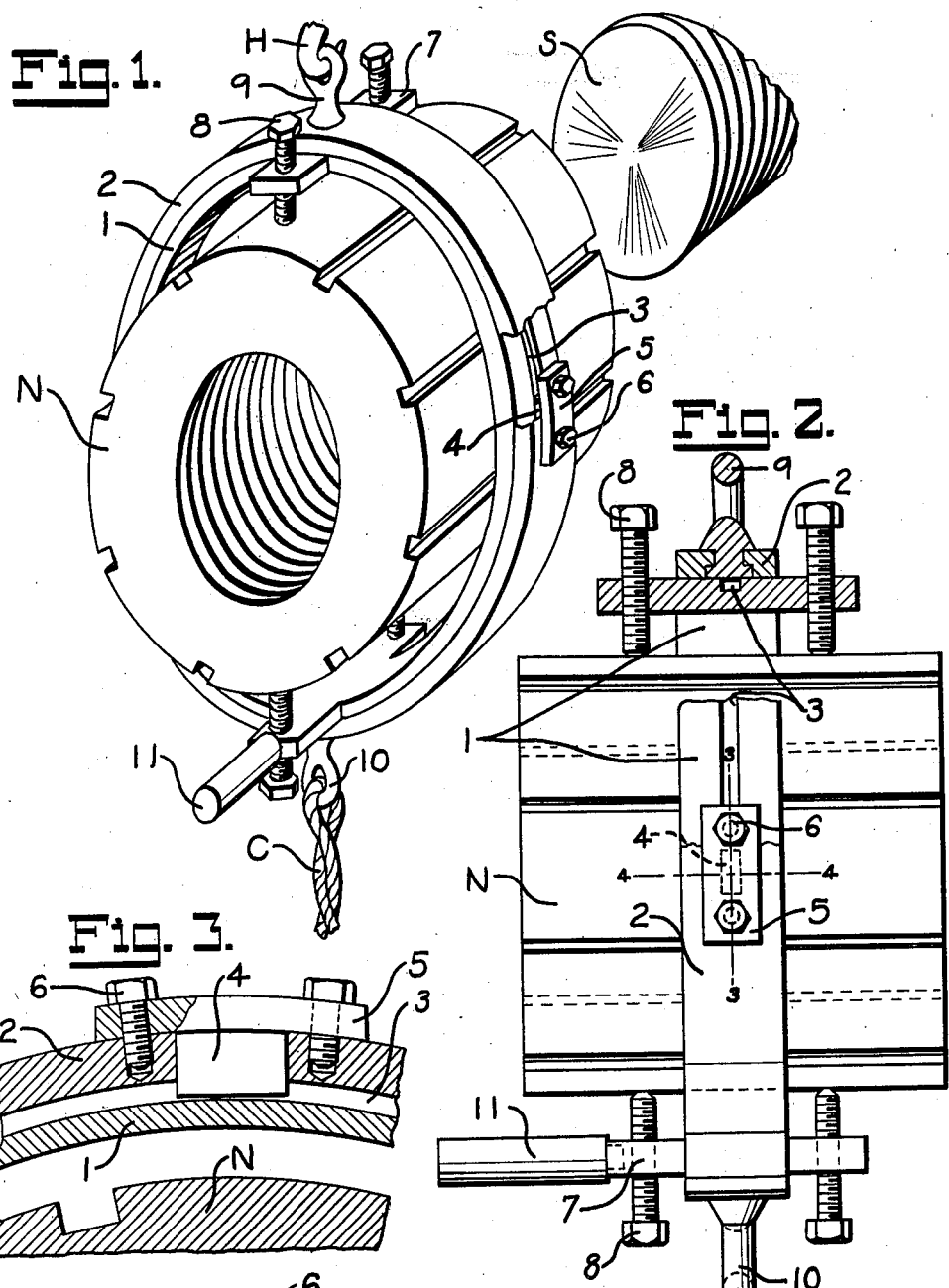
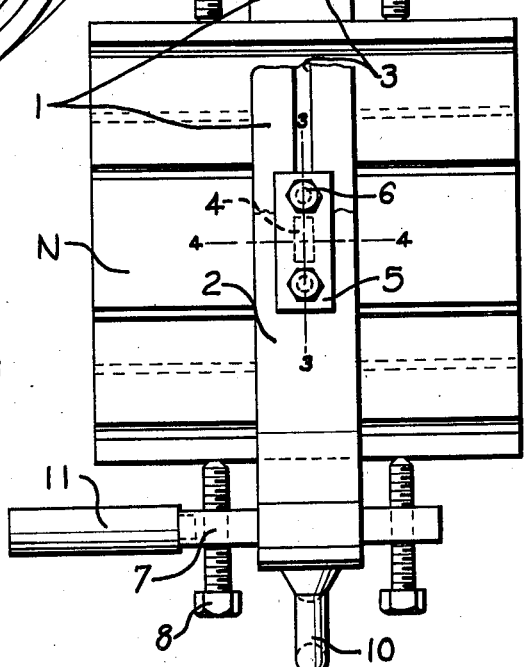
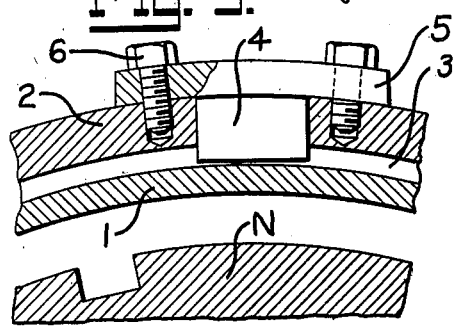
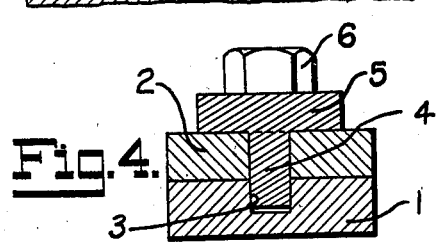
Inventor
James H. MacDonald
By Reynolds & Beach
Attorneys Patented July 6, 1943

2,323,614

UNITED STATES PATENT OFFICE 2,323,614

PROPELLER NUT HANGER

James H. MacDonald, Seattle, Wash.

Application March 21, 1941, Serial No. 384,481

1 Claim. (Cl. 29—84)

The proper and convenient securement of propeller nuts of large size upon a tail shaft is a difficult task, chiefly owing to the large size and weight of such nuts, and the necessity for supporting them in precise axial alignment with the tail shaft, while rotating them until there has been sufficient engagement of the nut with the tail shaft that the shaft will support the nut without danger of damage to the threads or to the shaft. The present invention is intended as a convenient means to accomplish the support of a large heavy nut or the like, at the proper level and in the proper alignment with a tail shaft or other device whereon it is to be mounted by rotary movement, and has for specific objects the provision of a device of this nature which is simple, rugged, inexpensive, easily assembled or repaired, and convenient to apply and to use. In particular it is an object to provide such a hanger which may be employed in conjunction with a crane or a chain hoist, such as is available in shops, shipyards, or drydocks, where such work would be done.

With these and other objects in mind, as will appear hereafter, my invention comprises the novel parts, and their relative arrangement and cooperation, as shown in the accompanying drawing, described in this specification, and as will be more particularly defined by the claim which terminates the same.

In the accompanying drawing I have shown my invention embodied in a typical and representative form.

Figure 1 is a perspective view of the device with parts in operative relationship, as they would appear in use, parts, however, being broken away for better illustration.

Figure 2 is a side elevation of the device assembled and in operative relationship relative to a nut, parts being broken away.

Figures 3 and 4 are sections on the respective lines 3—3 and 4—4 of Figure 2.

The nut, as illustrated at N, might be, for example, 18 inches in diameter and 12 or 15 inches in length, and it is intended to be threaded upon the tail shaft S. My hanger comprises in effect two coaxial rings or bands 1 and 2, provided with suitable means interengaging between them, so that one may rotate relative to the other, yet be held against displacement or deflection of the axis of one relative to the axis of the other; that is, the two are prevented from departing from their coaxial relationship. For convenience and cheapness the bands may, either or both, be circular, and one may fit closely within the other, but except for such considerations these are details of relative unimportance. The means interengageable between them should be easily applicable, and may be conveniently a circumferential groove—that is, a groove centered about the common axis—in one of them, and a key (or preferably two or more keys spaced angularly about the rings) carried by the other. As shown, the inner ring 1 is provided with a groove 3 in its outer circumference, and diametrically disposed elongated keys 4, each formed with a cap plate 5, pass through apertures provided in the outer ring 2 and are closely received within the groove 3 of the inner ring 1. Cap screws 6 or similar means supported in the cap plate 5 hold the keys in position, yet permit ready removal and renewal of a key, and, upon removal of the keys, permit separation or reassembly of the rings. Indeed, the screws 6 themselves may project within the groove as keys, and the keys 4 may be omitted. By these or similar means the rings are held, in use, in their coaxial relationship, yet are permitted to rotate the one relative to the other.

Means are provided whereby the nut N may be centered within and disposed coaxially of one ring, preferably the inner ring 1, and this regardless of the size of the nut, within reasonable limits. To this end lugs 7 project at angularly spaced points, and preferably longitudinally in each direction from the inner ring 1. At least two such pairs of lugs are employed, equally spaced about the ring. Set screws 8 are received in these lugs. The screws extend radially to engage the nut N, and by simple adjustment of these screws while the nut is lying upon the floor the ring 1 may be properly centered coaxially with the nut. The two axially spaced screws prevent any skewing of the ring with respect to the nut.

It may be pointed out here that it is a simple matter to remove screws 8 which are of improper length, and to substitute screws of proper length to engage nuts of different size.

As has been intimated, the hanger is adjusted to the nut while the nut rests upon the floor, usually resting upon one end. Normally the rings are disassembled, to reduce the weight necessary to be handled. The construction employed makes this conveniently possible. It is a simple matter to effect the adjustment of the parts at this time, and in this manner. The ring 1 is first centered and fixed upon the nut, then the ring 2 is secured about the ring 1. The assembly is then raised, as for instance by engagement of a hook H, which may be part of a chain hoist or the like, within an eye 9 secured in the outer ring 2. The entire assembly is then elevated until the axis of the nut is precisely in alignment with the axis of the tail shaft. To hold it in this position a cable or other guy means, as indicated at C, may be engaged in an eye 10 carried by the outer ring 2 at the side opposite the ring 9. The ends of this guy cable may be secured to rings or other anchors at the floor to steady the assembly in proper relationship relative to the tail shaft S. Here also, while only one eye 10 is shown, two or more may be employed if desired.

Thus assembled, hoisted, and steadied, the nut, with the inner ring 1, may be rotated, a handle 11 being provided for this purpose, and by this rotation with the nut properly held in axial alignment with the shaft, the threads of the nut may be engaged with the threads of the shaft, and the nut may be turned sufficiently upon the shaft that the shaft will afford it adequate support. The entire assembly may then be released by backing off screws 8, whereupon the entire assembly may be disengaged by relative axial movement.

Such a device is valuable in removing and in replacing a propeller at sea, for it insures against loss of the nut, and affords a convenient means for rotating the same, and for aligning the nut with the shaft, notwithstanding motion of the vessel.

The device is thus readily applied and readily disengaged. It is of simple construction, rugged, and the parts are readily renewed or replaced, if found necessary.

What I claim as my invention is:

A propeller nut hanger comprising an inner ring having lugs projecting axially in both directions, and equiangularly spaced about the ring, screws arranged in pairs, and spaced axially in each pair, threaded in such lugs for radial adjustment towards and from a nut within such ring, by such adjustment to support the ring and nut coaxially, and against relative displacement, an outer ring, means removably interengageable between the two rings to support the outer ring coaxially of the inner ring, and to prevent its displacement from such coaxial relationship, and means for the support of the outer ring, and thereby of the inner ring and nut, for rotation relative to the outer ring.

JAMES H. MacDONALD.